United States Patent
Palle Venkata et al.

(10) Patent No.: US 12,127,099 B2
(45) Date of Patent: Oct. 22, 2024

(54) BASE STATION OPERATION TO RESTRICT ACCESS BY REDUCED CAPABILITY USER EQUIPMENT

(71) Applicant: Apple Inc., Cupertino, CA (US)

(72) Inventors: Naveen Kumar R. Palle Venkata, San Diego, CA (US); Dawei Zhang, Saratoga, CA (US); Haijing Hu, Los Gatos, CA (US); Hong He, San Jose, CA (US); Sarma V. Vangala, Campbell, CA (US); Sudeep Manithara Vamanan, Nuremberg (DE); Wei Zeng, Saratoga, CA (US); Yuqin Chen, Beijing (CN)

(73) Assignee: Apple Inc., Cupertino, CA (US)

(*) Notice: Subject to any disclaimer, the term of this patent is extended or adjusted under 35 U.S.C. 154(b) by 379 days.

(21) Appl. No.: 17/593,504

(22) PCT Filed: Aug. 6, 2020

(86) PCT No.: PCT/CN2020/107575
§ 371 (c)(1),
(2) Date: Sep. 20, 2021

(87) PCT Pub. No.: WO2022/027520
PCT Pub. Date: Feb. 10, 2022

(65) Prior Publication Data
US 2022/0312298 A1  Sep. 29, 2022

(51) Int. Cl.
*H04W 48/10* (2009.01)
*H04W 8/24* (2009.01)
*H04W 74/0833* (2024.01)

(52) U.S. Cl.
CPC ............ *H04W 48/10* (2013.01); *H04W 8/24* (2013.01); *H04W 74/0833* (2013.01)

(58) Field of Classification Search
CPC .... H04W 48/10; H04W 8/24; H04W 74/0833
(Continued)

(56) References Cited

U.S. PATENT DOCUMENTS 10,111,155 B2 * 10/2018 Christensson ........ H04W 48/08
2013/0040597 A1    2/2013 Jang et al.
(Continued)

FOREIGN PATENT DOCUMENTS

| CN | 103857008 | 6/2014 |
| CN | 105307233 | 2/2016 |

(Continued)

OTHER PUBLICATIONS 62963484P (Year: 2020).*
62941974 (Year: 2019).*

*Primary Examiner* — Intekhaab A Siddiquee
(74) *Attorney, Agent, or Firm* — Fay Kaplun & Marcin, LLP

(57) ABSTRACT

A base station may restrict access by a user equipment (UE). The base station broadcasts access restrictions to one or more UE within a cell coverage area of the base station, wherein the access restrictions include one or more predetermined criteria that must be satisfied for a UE to be allowed to camp on the base station. The base station performs a random access channel (RACH) procedure to allow the UE to camp on the base station when the UE satisfies the one or more predetermined criteria.

18 Claims, 4 Drawing Sheets

(58) Field of Classification Search
USPC .......................................................... 370/328
See application file for complete search history.

(56) References Cited

U.S. PATENT DOCUMENTS

| | | |
|---|---|---|
| 2014/0099928 A1 | 4/2014 | Caldwell et al. |
| 2015/0119060 A1 | 4/2015 | Aoyagi et al. |
| 2016/0150566 A1 | 5/2016 | Lee et al. |
| 2016/0234759 A1 | 8/2016 | Kubota et al. |
| 2017/0331577 A1 | 11/2017 | Parkvall et al. |
| 2020/0178158 A1 | 6/2020 | Won et al. |
| 2021/0068036 A1 | 3/2021 | Chun |
| 2021/0227451 A1* | 7/2021 | Babaei .................. H04W 48/10 |

FOREIGN PATENT DOCUMENTS

| | | |
|---|---|---|
| CN | 111201813 | 7/2019 |
| CN | 111165021 | 5/2020 |
| CN | 111345072 | 6/2020 |
| EP | 2 600 677 | 6/2013 |
| EP | 3 525 546 | 8/2019 |
| WO | 2011/100540 | 8/2011 |

* cited by examiner

BASE STATION OPERATION TO RESTRICT ACCESS BY REDUCED CAPABILITY USER EQUIPMENT

BACKGROUND 5G new radio (NR) wireless communications support a variety of different types of user equipment (UEs). For example, in addition to mobile phones, 5G NR supports internet of things (IoT) devices, industrial IoT (IIoT) devices, wearable devices, etc. Some of these devices are known as reduced capability (RedCap) UEs, which have varying wireless capabilities compared to other UEs. There may be situations where the network would like to treat RedCap UEs differently than other types of UEs.

SUMMARY

Some exemplary embodiments are related to a base station having a processor and a transceiver communicatively connected to the processor. The processor is configured to perform operations. The operations include broadcasting access restrictions to one or more user equipment (UE) within a cell coverage area of the base station, wherein the access restrictions include one or more predetermined criteria that must be satisfied for a UE to be allowed to camp on the base station and performing a random access channel (RACH) procedure to allow the UE to camp on the base station when the UE satisfies the one or more predetermined criteria.

Other exemplary embodiments are related to a method performed by a base station of a wireless network. The method includes broadcasting access restrictions to one or more user equipment (UE) within a cell coverage area of the base station, wherein the access restrictions include one or more predetermined criteria that must be satisfied for a UE to be allowed to camp on the base station and performing a random access channel (RACH) procedure to allow the UE to camp on the base station when the UE satisfies the one or more predetermined criteria.

Still further exemplary embodiments are related to a baseband processor configured to perform operations. The operations include broadcasting access restrictions to one or more user equipment (UE) within a cell coverage area of a base station, wherein the access restrictions include one or more predetermined criteria that must be satisfied for a UE to be allowed to camp on the base station and performing a random access channel (RACH) procedure to allow the UE to camp on the base station when the UE satisfies the one or more predetermined criteria.

DETAILED DESCRIPTION

Figure 1:
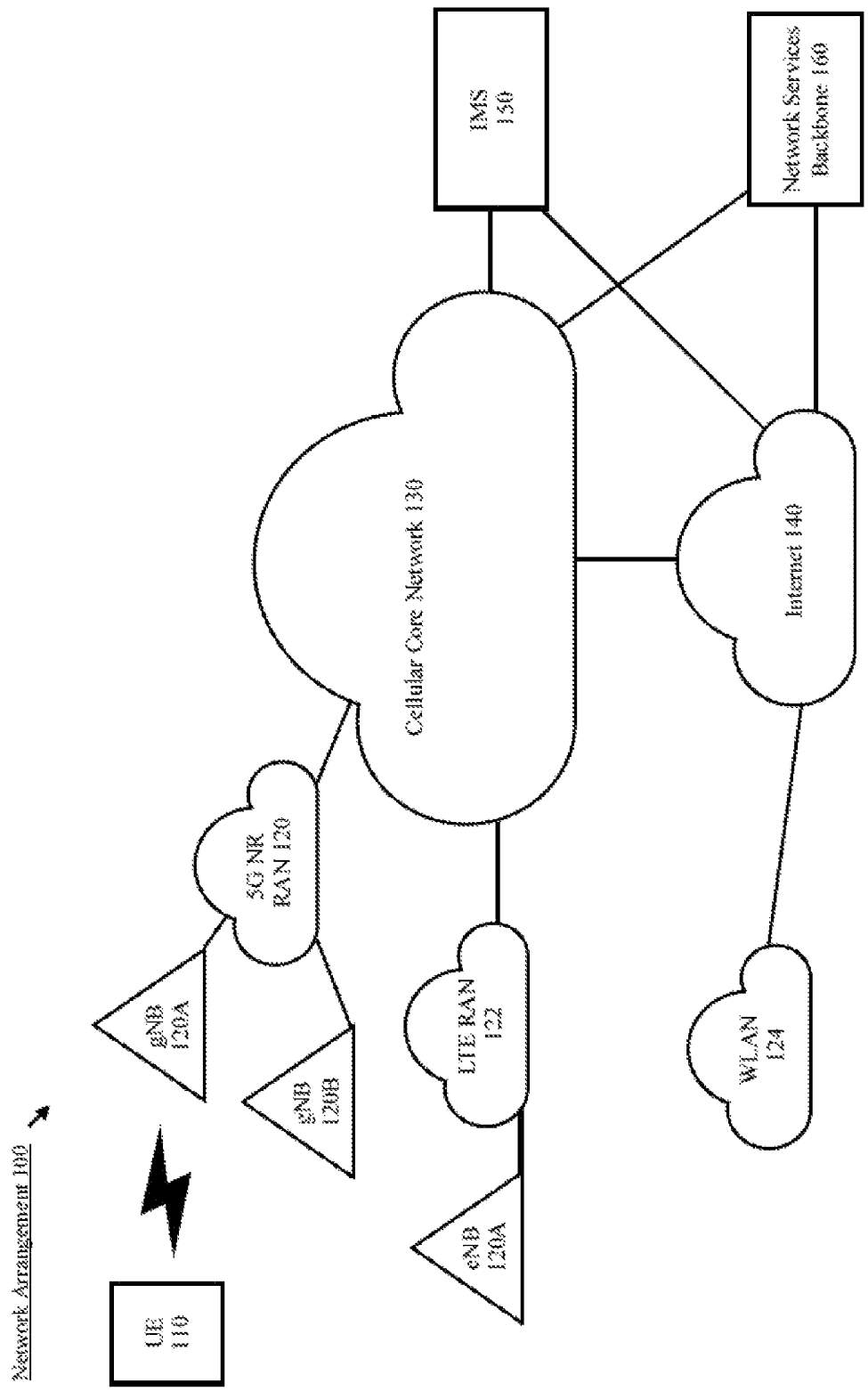
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe a device, system and method for a 5G new radio (NR) network to restrict access to the network by certain types of user equipment (UE).

The exemplary embodiments are described with regard to a network that includes 5G new radio NR radio access technology (RAT). However, the exemplary embodiments may be implemented in other types of networks using the principles described herein.

The exemplary embodiments are also described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

As noted above, there are various UEs, each having different capabilities that connect to the 5G NR network. However, in a given area, it may not be beneficial to have different UEs having different capabilities camped on the same cell since reduced capability UEs may utilize different parameters for wireless communications (e.g., bandwidth parts, data rates, etc.) than other UEs (e.g., mobile phones, laptops, etc.), meaning the cell would need to tailor its communications to all types of UEs. Thus, there may be instances where the network would like to treat the reduced capability (RedCap) UEs differently from other types of UEs.

Prior to describing the exemplary embodiments, several examples of RedCap UEs and their characteristics will be described. In a first example, devices in industrial settings such as temperature or humidity sensors may be connected industry devices. However, such devices are stationary, are not latency critical, and are fairly uncomplex with respect to their capabilities and hardware. These devices typically do not require the low latency data exchange provided by ultra reliable low latency communication (URLLC) or IIoT. It is also expected that these devices will operate in the field for many years with little to no maintenance, including battery replacement. Thus, power saving operations may be critical for these types of devices.

Another example of RedCap type devices with capabilities that differ from other UEs are surveillance devices (e.g., cameras). These devices are similar to the devices in the first example in that they are typically stationary and do not have stringent latency requirements. However, they may differ from the first example because these devices may be connected to a permanent power supply (although not required) and may have much higher upload data rates than many other UEs because of, for example, the video upload feeds they are providing.

Yet another example of RedCap type devices with different capabilities than many other UEs are wearable devices. Unlike the above examples, wearables typically have similar mobility to mobile phones and operations related to the same types of applications that are executable on mobile phones. However, because of the smaller form factor resulting in smaller batteries, these devices have a more stringent power saving requirement than mobile phones.

These examples of different types of UEs are by no means an exhaustive list of 5G-capable devices, but are provided as an example of the varying capabilities of different UEs that are connected to the 5G NR wireless network at any given time. Devices that are considered RedCap devices may be determined in various manners. For example, RedCap devices may be defined by the class of device (e.g., wearables, surveillance device, etc.). In another example, RedCap devices may be defined by the capability/functionality of the devices (e.g., battery life, processing power, latency requirements, etc.). The definition of what qualifies a UE as a RedCap UE may be set by standards (e.g., 3GPP standards) or may be left to the individual network provider. Some examples of categorizing UEs will be provided below.

According to some exemplary embodiments, the 5G NR network may limit access by RedCap UEs to one or more cells of the network based on one or more predetermined criteria. If the criteria is met, the RedCap UE may be allowed to connect with (or camp on) the g-NodeB (gNB) and exchange data with the network. Otherwise, the RedCap UE is not allowed to connect to the gNB.

FIG. 1 shows an exemplary network arrangement 100 according to various exemplary embodiments. The exemplary network arrangement 100 includes a UE 110. It should be noted that any number of UEs may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. During operation, the UE 110 may be within range of a plurality of gNBs. Thus, either simultaneously or alternatively, the UE 110 may connect to the 5G NR-RAN 120 via the gNBs 120A and 120B. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g. the 5GC for NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
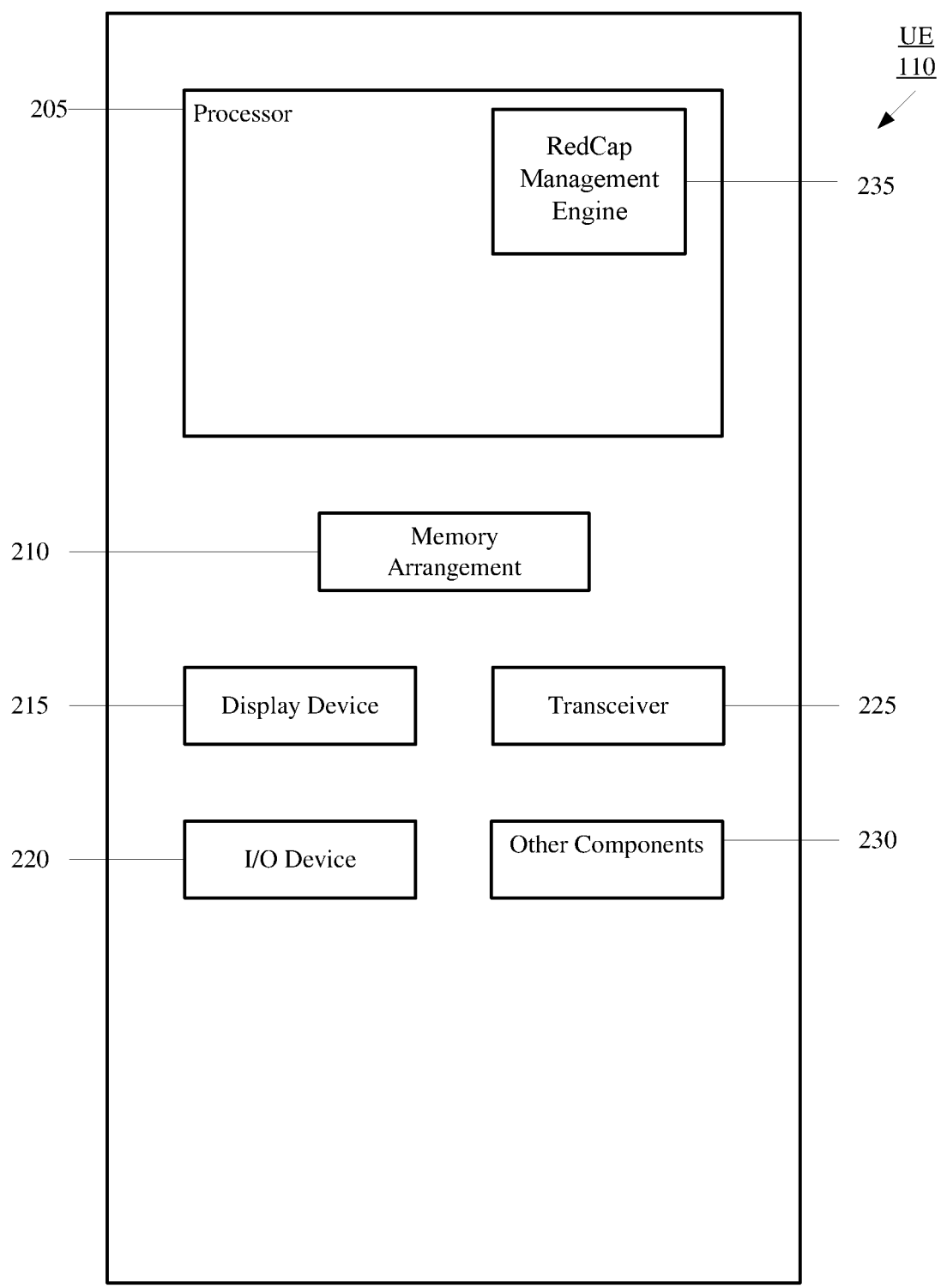
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. For purposes of this discussion, the UE 110 may be considered to be a reduced capability (RedCap) UE. However, it should be noted that the UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a RedCap management engine 235. The RedCap management engine 235 may perform various operations related to determining whether the UE 110 meets criteria identified in a broadcast received from a network, relaying capabilities of the UE 110 to the network, etc.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
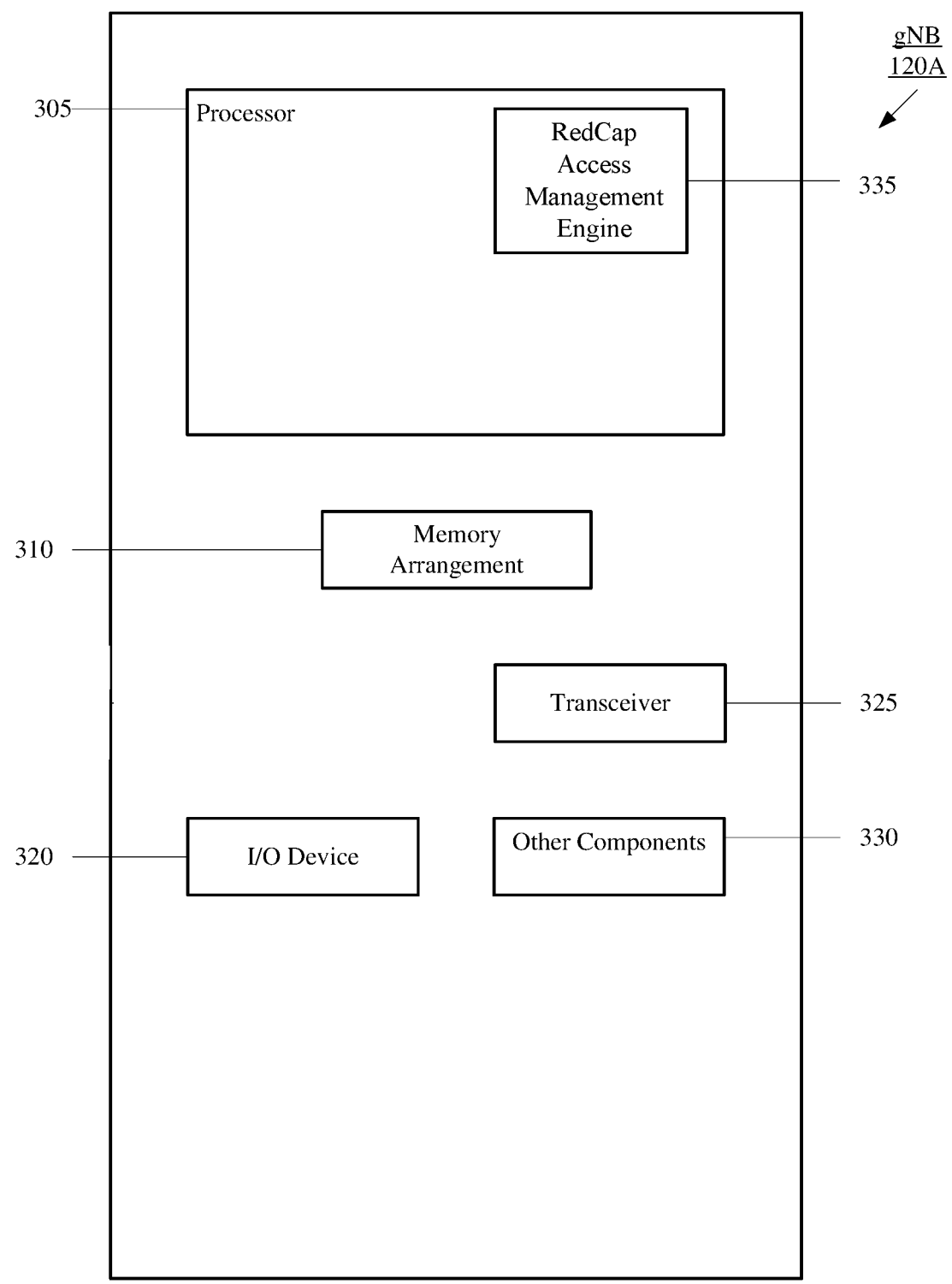
FIG. 3 shows an exemplary base station configured to establish a connection with a user equipment according to various exemplary embodiments.

FIG. 3 shows an exemplary network cell, in this case gNB 120A, according to various exemplary embodiments. The gNB 120A may represent any access node of the 5G NR network through which the UEs 110 may establish a connection. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include a RedCap access management engine 335 for performing operations including managing access to the gNB 120A by RedCap UEs. Examples of managing access will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Figure 4:
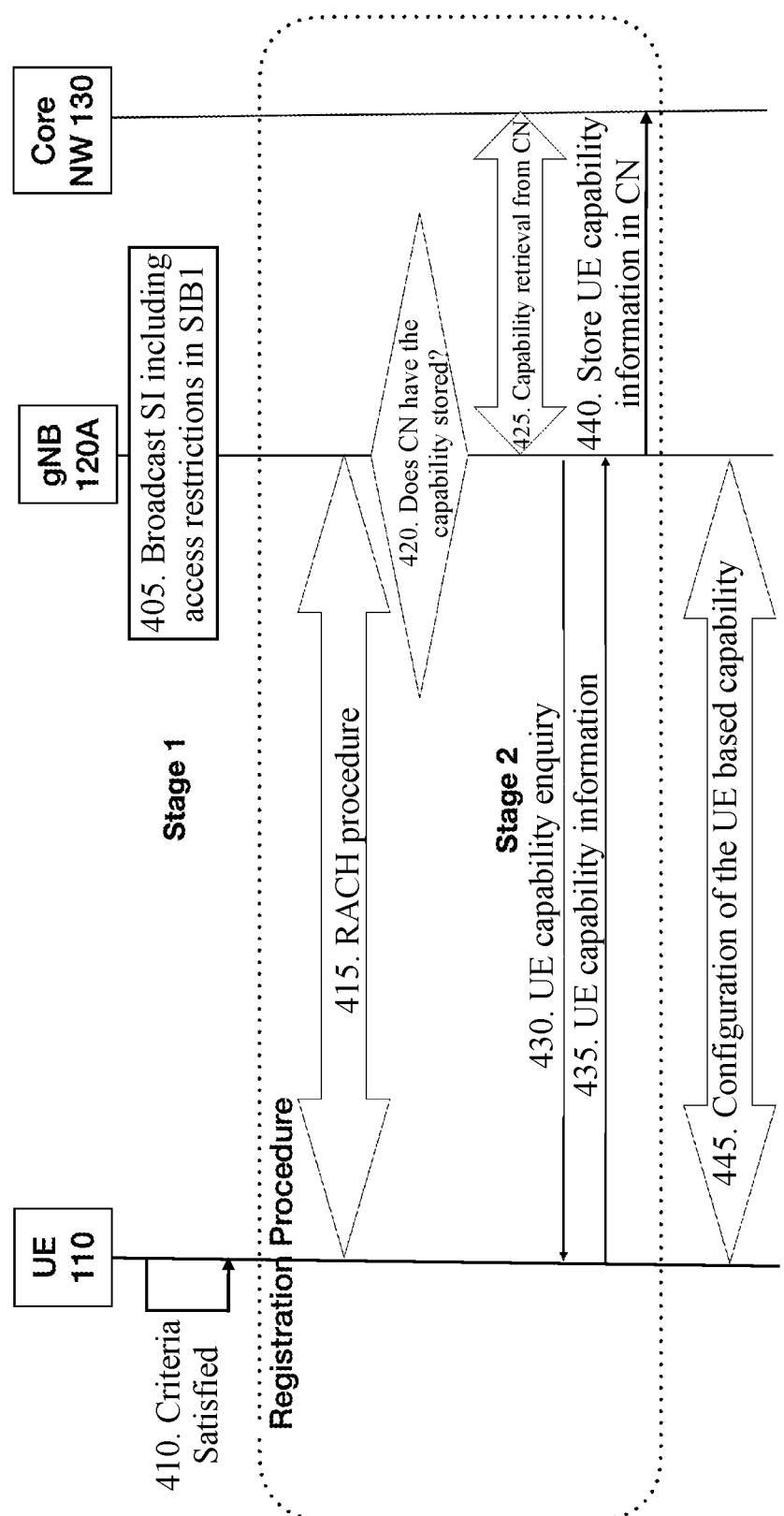
FIG. 4 is a signaling diagram illustrating a registration procedure according to various exemplary embodiments.

FIG. 4 shows a signaling diagram 400 illustrating a registration procedure according to various exemplary embodiments. As will be described in greater detail below, the registration procedure for the RedCap UE may have two stages. The first stage may be considered to be a coarse filter, while the second stage may be considered to be a finer filter to determine whether the RedCap UE may access a particular gNB.

At 405, the gNB broadcasts system information (SI) including access restrictions in system information block 1 (SIB1). The number and type of access restrictions may vary and some examples are provided below. However, as described above, the stage 1 access restrictions may generally be considered to be a coarse filter.

In some embodiments, to determine the access restrictions, the UEs may be classified into different categories. For example, UEs may simply be classified as either RedCap UEs or non-RedCap UEs. In such embodiments, the SIB1 may include an access restriction that indicates that RedCap UEs are not allowed to access the gNB 120A.

In other exemplary embodiments, UEs may additionally or alternatively be classified using UE categories (category 0, 1, 2, etc.) similar to those used in LTE, with each category having an allocated data rate. In such an embodiment, further details pertaining to parameters of the UE 110 may be utilized in addition to the UE category. For example, these details may include the bandwidth supported by the UE, downlink and uplink data rates supported by the UE, numerology support, minimum and maximum hybrid automatic repeat request (HARQ), and physical downlink shared channel (PDSCH) or physical uplink shared channel (PUSCH) latency requirements. Whether or not a UE 110 is a RedCap UE would depend on the UE category as well as these additional details regarding the UE's capabilities. In such embodiments, at 405, the SIB1 broadcast by the gNB 120A may include the different allowable categories and/or the additional details regarding the UE capabilities such as the examples provided above. In some exemplary embodiments, the UE 110 may belong to more than one category.

In further exemplary embodiments, RedCap UEs may additionally or alternatively be classified based on their capabilities. For example, in some embodiments, RedCap UEs may be classified based on uplink and downlink bandwidths supported by the RedCap UE. In such an embodiment, the broadcast at 405 may include the minimum supported uplink and downlink bandwidths.

In some embodiments, RedCap UEs may be classified based on their uplink and downlink data rate capabilities. In such an embodiment, the broadcast at 405 may include minimum uplink and downlink data rates supported. Alternatively, a range of data rate values for uplink and downlink may alternative be broadcast at 405 instead of a minimum value.

In some embodiments, RedCap UEs may be classified based on their mobility. In such an embodiment, the broadcast at 405 would include an indication as to whether the network will support a stationary RedCap UE or a non-stationary RedCap UE. Alternatively, a variant of different classes of mobility (grouping UEs using a spectrum of mobility classes between stationary and non-stationary) may be utilized in the broadcast at 405.

In some embodiments, RedCap UEs may be classified based on their power saving requirements. In such an embodiment, the broadcast at 405 identifies UE power classes that are allowed to connect to the network. From these examples it should be clear that the gNB 120A may broadcast any type of access restriction at stage 1 and one or more access restrictions may be broadcast in the SIB1 transmission.

Returning to FIG. 4, after the gNB 120A broadcasts the SIB1, the UE 110, at 410, determines whether or not the UE satisfies the criteria identified in the broadcast. If the UE does not satisfy the criteria, the UE 110 will not be allowed to camp on the gNB 120A. If, however, the UE 110 does satisfy the criteria, the UE 110 proceeds with the registration procedure to camp on the gNB 120A. As described above, stage 1 (e.g., the broadcast at 405 and the UE determination if the criteria is met at 410) serves as a coarse or pre-filter to restrict access to the gNB 120A to RedCap UEs that meet predetermined criteria.

At 415, the UE 110 performs a random access channel (RACH) procedure to attach/camp on the gNB 120A. At 420, the network determines whether or not the core network 130 has the capabilities of the UE 110 stored. If the core network 130 has the capabilities of the UE 110 stored, then at 425, these capabilities are retrieved from the core network 130. If, however, the capabilities of the UE 110 are not stored on the core network 130, then at 430, the gNB 120A requests the UE capabilities from the UE 110. In response, at 435, the UE 110 transmits its capability information to the gNB 120A. At 440, the capability information of the UE 110 is stored in the core network 130 for future use.

Stage 2 (the determination of the UE capability in 420-440) serves as a secondary filter and includes an additional one or more predetermined parameters that a RedCap UE must satisfy to be allowed to exchange data with the core network 130 via the gNB 120A. Although the one or more predetermined parameters that the RedCap UE 110 must satisfy in Stage 2 may include any desired parameters, some examples of such parameters may include downlink and uplink data rates supported by the UE, the number multiple in multiple out (MIMO) layers supported, numerology support, minimum and maximum HARQ, PDSCH or PUSCH latency requirements, etc. At 445, the gNB 120A configures the UE 110 based on the UE's capability. If the capabilities of the RedCap UE 110 meet the predetermined parameters in Stage 2, then the configuration of the RedCap UE 110 at 445 is a radio resource control (RRC) configuration allowing the RedCap UE 110 to exchange data with the core network 130 via the gNB 120A. If, however, the capabilities of the RedCap UE 110 do not meet the predetermined parameters in Stage 2, then the configuration of the RedCap UE 110 at 445 is to deny the UE 110 access to the network 130 via the gNB 120A. In some embodiments, in addition to denying the UE 110 access, the gNB 120A may inform the RedCap UE 110 of a nearby cell that does support the capabilities of the RedCap UE 110.

In some embodiments, the criteria that the RedCap UE 110 must meet in Stage 1 before being allowed to camp on the gNB 120A is/are less stringent than those of Stage 2. While the Stage 1 criteria may include one or two parameters, the criteria of Stage 2 may include any number of parameters. If newer classes of RedCap UEs are defined at a later time than the initial configuration of the network, Stage 2 may be updated with these newer classes. Adding new criteria to the Stage 2 filtering instead of the Stage 1 filtering allows updates to be made without having to rebroadcast the updated information or having to update any UEs that previously were denied access to the network because they did not meet the initial criteria defined in Stage 1.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A base station of a wireless network, comprising:
    a processor configured to perform operations comprising:
        broadcasting access restrictions to one or more user equipment (UE) within a cell coverage area of the base station, wherein the access restrictions include a first set of predetermined criteria that is to be satisfied for a reduced capability (redcap) UE to be allowed to camp on the base station;
        performing a random access channel (RACH) procedure to allow the redcap UE to camp on the base station when the redcap UE satisfies the one or more predetermined criteria; and
        receiving redcap UE capability information from the redcap UE, the redcap UE capability information associated with a second set of predetermined criteria for the redcap UE to establish a radio resource control (RRC) configuration with the base station; and
    a transceiver communicatively connected to the processor.

2. The base station of claim 1, wherein the first set of predetermined criteria comprises a category of UEs.

3. The base station of claim 1, wherein the first set of predetermined criteria comprises one of a minimum downlink bandwidth or a minimum uplink bandwidth supported by the redcap UE.

4. The base station of claim 1, wherein the operations further comprise:
    determining whether the redcap UE capability information for the redcap UE is stored in a core network of the 5G NR wireless network.

5. The base station of claim 4, wherein, when the redcap UE capability information is not stored in the core network, the operations further comprise:
    transmitting, to the UE, a request for the redcap UE capability information; and
    transmitting the redcap UE capability information to the core network for storage.

6. The base station of claim 5, wherein the redcap UE capability information includes downlink and uplink data rates, the number multiple in multiple out (MIMO) layers, numerology, minimum and maximum hybrid automatic repeat request (HARQ), and physical downlink shared channel (PDSCH) or physical uplink shared channel (PUSCH) latency requirements.

7. The base station of claim 5, wherein the operations further comprise:
when the redcap UE capability information satisfies one or more predetermined parameters, transmitting a radio resource control (RRC) configuration transmission to the redcap UE.

8. The base station of claim 5, wherein the operations further comprise:
when the redcap UE capability information does not satisfy one or more second predetermined parameters, rejecting the UE from registering with the base station.

9. The base station of claim 8, wherein the operations further comprise:
providing an indication to the redcap UE of a second base station that supports capabilities of the UE.

10. A method, comprising:
at a base station of a wireless network:
broadcasting access restrictions to one or more user equipment (UE) within a cell coverage area of the base station, wherein the access restrictions include a first set of predetermined criteria that is to be satisfied for a reduced capability (redcap) UE to be allowed to camp on the base station;
performing a random access channel (RACH) procedure to allow the redcap UE to camp on the base station when the redcap UE satisfies the one or more predetermined criteria; and
receiving redcap UE capability information from the redcap UE, the redcap UE capability information associated with a second set of predetermined criteria for the redcap UE to establish a radio resource control (RRC) configuration with the base station.

11. The method of claim 10, wherein the first set of predetermined criteria comprises one of a category of UEs, a minimum downlink bandwidth supported by the redcap UE or a minimum uplink bandwidth supported by the redcap UE.

12. The method of claim 10, further comprising:
determining whether the redcap UE capability information for the redcap UE is stored in a core network of the 5G NR wireless network.

13. A baseband processor configured to perform operations comprising:
broadcasting access restrictions to one or more user equipment (UE) within a cell coverage area of the base station, wherein the access restrictions include a first set of predetermined criteria that is to be satisfied for a reduced capability (redcap) UE to be allowed to camp on the base station;
performing a random access channel (RACH) procedure to allow the redcap UE to camp on the base station when the redcap UE satisfies the one or more predetermined criteria; and
receiving redcap UE capability information from the redcap UE, the redcap UE capability information associated with a second set of predetermined criteria for the redcap UE to establish a radio resource control (RRC) configuration with the base station.

14. The baseband processor of claim 13, wherein the first set of predetermined criteria comprises one of a category of UEs, a minimum downlink bandwidth supported by the redcap UE or a minimum uplink bandwidth supported by the redcap UE.

15. The baseband processor of claim 13, wherein the operations further comprise:
determining whether redcap UE capability information for the UE is stored in a core network of the 5G NR wireless network.

16. The baseband processor of claim 15, wherein, when the redcap UE capability information is not stored in the core network, the operations further comprise:
transmitting, to the redcap UE, a request for the redcap UE capability information; and
transmitting the redcap UE capability information to the core network for storage.

17. The baseband processor of claim 15, wherein the redcap UE capability information includes downlink and uplink data rates, the number multiple in multiple out (MIMO) layers, numerology, minimum and maximum hybrid automatic repeat request (HARQ), and physical downlink shared channel (PDSCH) or physical uplink shared channel (PUSCH) latency requirements.

18. The baseband processor of claim 15, wherein the operations further comprise one of:
when the redcap UE capability information satisfies one or more predetermined parameters, transmitting a radio resource control (RRC) configuration transmission to the redcap UE; or when the UE capability information does not satisfy the one or more predetermined parameters, rejecting the redcap UE from registering with the base station.

* * * * *